(12) United States Patent
Yingling

(10) Patent No.: US 7,302,566 B2
(45) Date of Patent: Nov. 27, 2007

(54) INTERNET SECURITY SYSTEM

(76) Inventor: Wayne Yingling, 602 S. Vine St., O'Fallon, IL (US) 62269

( * ) Notice: Subject to any disclaimer, the term of this patent is extended or adjusted under 35 U.S.C. 154(b) by 847 days.

(21) Appl. No.: 10/650,499

(22) Filed: Aug. 28, 2003

(65) Prior Publication Data

US 2004/0153889 A1    Aug. 5, 2004

Related U.S. Application Data

(60) Provisional application No. 60/410,840, filed on Sep. 13, 2002.

(51) Int. Cl.
*H04L 9/00* (2006.01)
(52) U.S. Cl. ...................................... 713/165
(58) Field of Classification Search .................. 726/16, 726/30; 713/165, 164, 166, 167
See application file for complete search history.

(56) References Cited

U.S. PATENT DOCUMENTS

| 5,870,468 | A * | 2/1999 | Harrison | 713/165 |
| 6,615,349 | B1 * | 9/2003 | Hair | 713/165 |
| 6,889,378 | B2 * | 5/2005 | Sueyoshi | 719/310 |
| 6,976,165 | B1 * | 12/2005 | Carpentier et al. | 713/165 |
| 7,069,591 | B1 * | 6/2006 | Weicher | 726/26 |
| 7,073,059 | B2 * | 7/2006 | Worely et al. | 713/168 |
| 7,146,640 | B2 * | 12/2006 | Goodman et al. | 726/16 |
| 7,146,644 | B2 * | 12/2006 | Redlich et al. | 726/27 |
| 2002/0141588 | A1 * | 10/2002 | Rollins | 380/277 |
| 2003/0126434 | A1 * | 7/2003 | Lim et al. | 713/164 |

* cited by examiner

*Primary Examiner*—Matthew B Smithers
(74) *Attorney, Agent, or Firm*—Polster, Lieder, Woodruff & Lucchesi, LC

(57) ABSTRACT

A method of preventing internet hacking of web sites. Operating system component files are encrypted by first selecting a secret key which is randomly inserted into the contents of the source file. The file is then encrypted using a second, separate key. When the encrypted OS file is subsequently requested by the operating system, it is decrypted and the decrypted file searched for the second key. If the second key is found, the file is considered valid and is processed by the operating system. If the second key is not found, the file is considered invalid and is not processed.

8 Claims, 1 Drawing Sheet

Sequencer Process

Sequencer Process

Desequence Process

INTERNET SECURITY SYSTEM

CROSS REFERENCE TO RELATED APPLICATIONS

This application is based upon Provisional Patent Application 60/410,840 filed Sep. 13, 2002.

STATEMENT REGARDING FEDERALLY SPONSORED RESEARCH OR DEVELOPMENT

N/A

BACKGROUND OF THE INVENTION

This invention relates to internet security, and more particularly, to a method of providing such security which complements and significantly enhances existing web security strategies. The method of the invention minimizes the impact of a security breach which has already occurred, by providing a pre-emptive damage control which keeps the user's customers or clients from knowing their web site security had been compromised. The invention ensures that any hacker-perpetrated changes in content or function of a targeted web site are immediately identified and blocked from executing any unauthorized operation which will adversely effect people accessing the web pages. The method of the invention also allows for quick substitution of the original, legitimate code and content for faster recovery and minimal downtime of the web site. The method of the invention is based upon a concept of "Transform To Unique State" or TRUST of the files and program codes making up the content of a web site. This TRUST approach differs significantly from other commercially available web site security products.

Any company or organization wishing to be taken seriously in its industry or marketplace now must have a web presence that is credible and representative of the image that the company wishes to project to customers, investors, employees, and others. The web page, because of its immediate availability, is typically now the first line of inquiry about a company and its products or services. Web sites have reached a level of sophistication and functionality that has led businesses to regard them as far more than simple platforms for conveying information about the company and its products. Typical services managed though the web now include processing web-based sales, providing metered services for a fee, serving as a portal for government and private-sector professionals to perform document sharing/review, schedule appointments, net meetings, and other internal business processes, acting as a fund-raising platform for non-profit organizations, accessing libraries and other databases or information repositories, serving as a front end for relational databases, and authorizing and consummating brokered financial transactions.

Companies now transact substantial portions of their commercial activities directly over the web. For this reason, private and public sector entities have invested substantial sums in creating web site content, programming elaborate business processes for internet deployment, purchasing powerful servers and network equipment; and, organizing operations to ensure a web site remains available "24/7" with no down-time.

Unfortunately, the web has proven vulnerable to a variety of attacks perpetrated by individuals or organizations for mischievous or malicious purposes. Web sites are routinely subjected to a variety of probes searching for unprotected ports or previously planted "Trojan Horse" executables which provide an avenue for an intruder to commandeer all or part of a web site's function. In a number of highly publicized cases, major electronic commerce sites have been effectively shutdown by broad-based attacks. Often the server software, which powers the web site, has itself been utilized as the platform for replicating and perpetuating disruptive attacks. In addition, one system's vulnerability can have a ripple effect throughout the web as that server's resources become the vector for attacking or infecting other web servers.

In its most benign form, a hacker substitutes an inappropriate web page for the legitimate web content a business intends to display for its clients or users. However, even this simple form of attack has grave consequences, because the attacker is sabotaging the planned function of the web page and disrupting those transaction or business process that would otherwise take place.

More insidious attacks include the substitution of code aimed at collecting information for subsequent illegal and fraudulent purposes, the introduction of surreptitious interrupts and intercepts, commandeering system resources for malicious purposes such as using the web server as a replication platform for virus transmittal or denial of service attacks, and subtle alterations aimed at introduction of parasitical code agents that could circumvent normal encryption measures by passing information out from the server to listening sites, causing transactions which are apparently completed to instead "dead-end", change distribution of a "for-fee" product or service to a "for-free" product or service, open vulnerabilities in business critical, back end RDBMS by allowing review of the back end code so key information such as user id's, passwords, data structures, server IP addresses, etc can be picked off, and provide an avenue for gathering information on system architecture or even establishing an ongoing beachhead for penetration of underlying data systems.

The costs of this vulnerability include the opportunity costs of lost transactions, the loss of clients and customers due to transactions going wrong, the loss of clients and customers because of lost confidence in the web site owner. Secure, private transactions are the minimum expectation and highest sensitivity for customers using e-commerce. This barrier (i.e., secure and private transactions) has taken a while to overcome, even with the significant convenience of ordering on-line. This confidence is also quick to go, with a breached system being the scapegoat and target for customer's frustration and sense of violation.

A security breach is intensely disruptive to the normal operations of a company's IT department. It sets back plans, disrupts normal routines, and derails resources. Companies that have suffered a breach tend to react impulsively and in a paranoid fashion, with the result that the attack is magnified beyond the actual damage which has been suffered. Companies also often over-react by throwing money and resources immediately and haphazardly at the problem, rather than sorting through the problem rationally and with a measured approach.

The principal protections in current web deployments are tools that monitor incoming traffic to the web server and review outgoing hypertext transfer protocol (http) materials returned by the web server to a client browser. These tools are generally awkward in use and do not effectively protect against system vulnerabilities that do not enter through the web server (e.g., NIMDA, Code Red). Maximum protection is diametrically opposed to maximum accessibility for legitimate users in current web server/browser configurations.

Ports cannot be closed without concomitant restrictions on their ease of access. IP address restrictions are also a barrier to free, unhampered access by new customers, as well as being difficult to administer. Adding password protection both increases administrative burdens on the systems and places a significant obstacle to a first time customer who may connect only once with the page before making a buying decision. Waiting for a password may quash a sale before it can happen.

A variety of protection strategies are currently available for companies seeking to protect their web pages. The principal focus of these tools has been the interaction between web server software (e.g. Microsoft Internet Information Server [IIS]) and the web browser software (e.g. MS Internet Explorer, Netscape Navigator) residing on the customer's personal computer or device. Interaction between the company web site and the customer is bi-directional and utilizes the http. The customer activates the dialogue by submitting a universal record locator [url] string containing the desired web site address. The company web server at that site responds with a combination of hypertext markup language and code via http. This stream of information is, in turn, interpreted by the customer's browser software and rendered graphically as a web page display.

The security products currently available fall into several categories which include software that filters incoming web traffic, software that looks for suspicious changes in the out-bound http streams returned by the company's web server, protections inherent in the web server and operating system software (including simple encoding schemes or a compilation of source code), multiple server architectures that rely upon the complexity of serial barriers to thwart intruders, and monitors that constrain access by filtering "incoming" traffic based on the originating IP address or type of interaction. These products typically monitor, even block, ports which are the gateways into and out of any server attached to the internet. More expensive and elaborate approaches to web site security combine these filters with a complex layering of servers, proxies, and user-specific access controls.

These products have a number of disadvantages. They are expensive, elaborate to maintain, and do not address flanking maneuvers such as emailed agent and lateral intrusions. Further, they are primarily directed at access control rather than neutralizing intended damage and disruption. Recognition is not instantaneous. Recovery can be very complex. All these techniques aim to prevent a hacker from ever reaching the functions and files that lie behind the web server. To accomplish this, the ports which serve as the gateways in and out of any server attached to the internet are monitored or blocked. More expensive and elaborate approaches to web site security combine these filters with a complex layering of servers, proxies, and user-specific access controls. Again, these techniques are directed at preventing a hacker from reaching the underlying functions and files behind a web server. Recent history shows that web sites are constantly bombarded with attacks, and defenses are breached with regularity. When a company's web site is altered, often the exploited vulnerability becomes known only when customers begin complaining about lack of normal functions or highly visible defacements.

BRIEF SUMMARY OF THE INVENTION

In accordance with the invention, a method is described to prevent internet hacking of web sites. In a first step of the method, OS component files are encrypted. This involves selecting a secret key which is randomly inserted into the contents of a source file. This file is then encrypted using a second, separate key. When the file has been encrypted in this manner, it cannot be viewed, modified, or replaced without first decrypting the file using the proper key.

When the encrypted OS file is subsequently requested by the operating system, the encrypted file is now decrypted and the decrypted file searched for the second key. If the second key is found, the file is considered valid and is processed by the operating system. If the second key is not found, the file is considered invalid and is not processed. If a hacker places an unencrypted (or improperly encrypted) file on the web server, the sequencer will know the web site has been violated. When this occurs, the administrator is notified by email what has happened, and the "bad" file is replaced with the correct one from a backup data store, or a "file not found" error is generated. Importantly, the hacker's code is not executed.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

Figure 1:
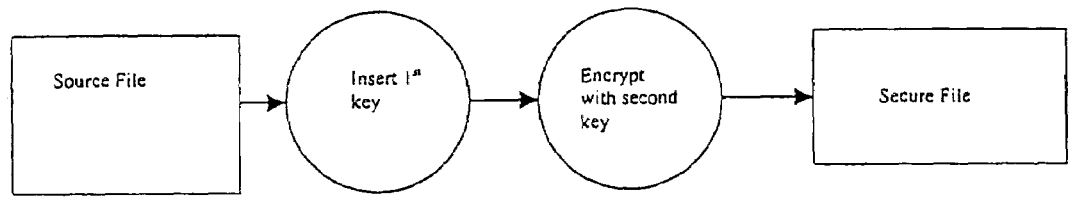
FIG. 1 is a simplified flow chart of a file encryption process of the invention; and, FIG. 2 is a simplified block flow chart of a desquencing process executed in accordance with the method of the invention.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

The method of the present invention complements and significantly enhances existing web security strategies. It focuses on minimizing the impact of a security breach after the breach has occurred, and is designed to keep a company's customers and clients from knowing web site security has been compromised. Further, hacker made changes in content or function of a targeted web site are immediately identified and are not executed. Accordingly, hacker activity is prevented from being carrying out so there is no adverse consequences to customers. The invention provides for quick substitution of original, legitimate code and content for that inserted by a hacker, so to facilitate faster recovery and minimal web site downtime. The software by which the present invention is carried out changes the state of the files making up a web site so any executable file or software agent successfully placed by a hacker is automatically rendered incompatible with the site's normal function.

Transform To Unique State (TRUST) is based upon an assumption that every copy of an Operating System's (OS) software executes applications designed and developed for that version consistently across all copies of it. That is, a consumer expects Microsoft Office® or MS Word® to run consistently so long as the product is installed on a compatible Operating System. However, what if every OS copy was unique in terms of what software it would run? So, if there were one million copies of Microsoft Windows 2000 in place, then installing Microsoft Office® or MS Word® on each of those machines would require the specific programming of one million, different versions of the program. This is unworkable from a development and distribution perspective.

From a hacker's perspective, they expect their code to execute across all copies of the same OS, just like consumers expect it to execute. But, what if a hacker had to program specifically for every computer? What if, in addition, they did not know the correct format for each machine; and, for all practical purposes, it was impossible to figure out. Hacking would be then become substantially more difficult.

The TRUST method of the present invention is directed at making an OS or component on every machine unique in terms of what the OS or component on a particular machine deems compatible. TRUST is implemented by adding components to the OS or web server that renders the web site file formats unique to that particular server. Thus, unless a hacker knows how to "write" code for that particular web server, they cannot view, replace, nor modify any files on the web site.

The uniqueness now built into each web site server is accomplished by encrypting and decrypting the web site's files. Encryption and decryption have significant benefits in this regard because, for example, even if an unencrypted file is decrypted the result is now an encrypted file. It is this effect that produces the security benefits of the method.

When TRUST is implemented, it provides the following security benefits:

Defacement protection

Web site virus protection. Stopping a virus from using the web site as a launching pad for infecting web site users. The present invention prevents infection of the web site in the first place.

Intellectual property protection by not allowing unauthorized users to copy backend application code, documents, graphics, etc.

Stopping hackers from viewing application code that would give them passwords, locations, and structure of databases used in an application.

Immediate notification of attempted defacement or modification of files.

The method of the invention is independent of OS patch levels. Thus, even if the administrator is behind in security updates, the web site is still protected.

Piece of mind knowing that, unless notification has been received, the web site has not been maliciously modified nor viewed.

No false alarms. The user is notified only if something really happens.

Figure 2:
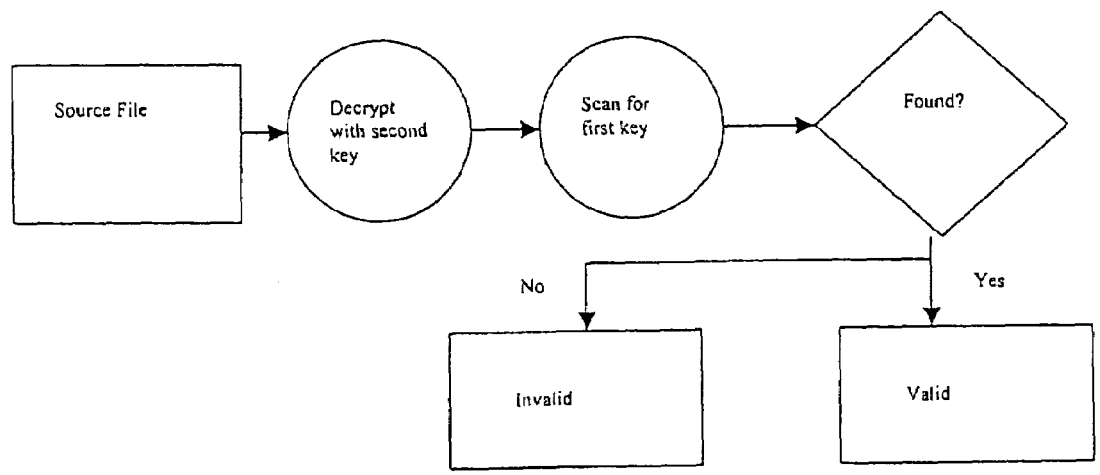

The method of the invention comprises two steps. The first step is transforming un-encrypted files into encrypted files as shown in FIG. 1. The second step is sequentially de-encrypting the file back to its un-encrypted state as shown in FIG. 2.

The first or transformation step involves encrypting web site files (a source file) with a key supplied by the web server administrator. This makes the files impossible to view, modify, or replace without first decrypting the files using the proper key. Encryption/decryption reversal also includes the name of the files themselves as a further barrier to substitution. The sequencer makes files compatible with IIS, if and only if, the file decrypts properly using the web server's key. If a requested file decrypts properly then the decrypted version is passed to the IIS for processing.

Thus, as shown in FIG. 1 and in accordance with the method of the invention, OS component files (source files) are first encrypted. Before encrypting the files, a secret key (the first key) is randomly inserted into the contents of the source file. The file is then encrypted using a second, separate key. When the encrypted OS file is then requested by the operating system or one of its components, the encrypted file is first decrypted and the decrypted file searched for the second key. This is referred to as a desequencing process and is shown in FIG. 2.

As a result of the desequencing process, one of two things will happen. One is that the first key is found where it is embedded in the source file and because of this the file source is considered validated. Once validated, the file is handed to the requesting component for processing. Second, the first key is not found in the decrypted source file. The source file is now considered invalid. As shown in FIG. 2, an invalid file is not handed to the requesting component for processing. Further, it will be understood by those skilled in the art that the sequencer can readily distinguish between an encrypted file, an unencrypted file, and a file encrypted with an incorrect key. Therefore, if a hacker places an unencrypted (or improperly encrypted) file on the web server, the sequencer knows the web site has been violated because it's de-encryption process will result in an encrypted file, not an unencrypted file. When this occurs, the administrator is notified by email what has happened; and, the "bad" file is replaced with the correct one from a backup data store. Or, a "file not found" error is generated. In no instance, however, is the hacker's code executed. The above described method applies to all file types (html, asp, graphics, documents, pdf's, executables).

Two of the most recent web site viruses (Code Red and NIMDA) infected web sites by exploiting a hole in the IIS. In, 1999 Microsoft placed a patch for download that would close the hole. In 2002, both Code Red and NIMDA were very successful at infecting millions of web sites. NIMDA used the same exploit as Code Red, even though it arrived several months after Code Red, and was still successful at infecting web sites with its virus. A user of an infected web site would more than likely infect their desktop computer. Experience has shown that OS patches are not a good way of protecting a web server. Web servers and OS's in general have security flaws not yet discovered. When these flaws are exploited, it does not matter that a system is an up-to-date system with all the appropriate patches, because there will not be a patch available for the newly found flaw. The way to stop this problem is by use of a method that supplies required protection independent of an operating system's patch level.

Both the NIMDA and Code Red worms caused complete shutdown of web servers as administrators tried to fix the problems. In some cases, Internet access to companies was completely shut off. Loss of production resulted. The method of the present invention stops both of these worms. This is because, in both cases, a web site can never be infected since the code posted by the worms is not executable because the code posted by the hacker is not compatible with IIS due to the implementation of TRUST.

The resulting cost benefit from use of the method of the invention as embodied in TRUST is enormous. Consider that some 5 million servers were infected by Code Red and NIMDA. Assuming 4 hours per server to restore and repair the web server at a current industry rate of $65/hr., the cost of fixing the problems caused by these viruses was on order of $1.3 billion dollars. Similar savings would be realizable by preventing occurrences of this type in the future by having a TRUST system installed.

The software by which the method of the present invention is implemented is designed to operate on a wide range of operating system environments. In one application, the software is programmed with the existing web server software so as to be, in effect, an "add on" to the existing system. In a second application, the software is programmed into a stand alone server which communicates with the web server. Now, a redirector is programmed as an add-in to the web server and is responsible for redirecting requests to the server in which the software is embedded whenever appropriate. Third, if the web server source code is available, the software embodying the method of the invention is programmed directly into the web server. The web server is then rebuilt and distributed.

In view of the above, it will be seen that the several objects and advantages of the present invention have been achieved and other advantageous results have been obtained.

Having thus described the invention, what is claimed and desired to be secured by Letters Patent is:

1. A method of preventing unauthorized personnel access to a computer file used to perform a function on the computer comprising:
    selecting a file;
    inserting a key into the contents of the file, the key being randomly inserted into the contents of the file; and, encrypting the file after the key has been inserted using an encryption key, which the encryption key is a second key, separate from the first said key and decrypting the encrypted file using the second key; and, scanning the decrypted file to locate the first said key, the decrypted file then being validated for use to perform the function for which it is used if the first said key is found, but the decrypted file not being validated for use if the first said key is not found which is an indication that the file has been altered without authorization.

2. The method of claim 1 further including storing a copy of the file after it is encrypted using the second key and replacing the original file with the stored copy thereof if the first said key cannot be found after the file is decrypted, the replaced copy of the file then being used to perform the desired function.

3. The method of claim 1 in which the file is an operating system (OS) component file.

4. A method of preventing an unauthorized person access to an operating system (OS) file of a computer, comprising:
    selecting an operating file;
    inserting a first key into the contents of the file and then encrypting the resulting file using a second key, the first key being randomly inserted into the contents of the file;
    subsequently decrypting the file using the second key and examining the decrypted file for the first key;
    validating the decrypted file for use by the computer if the first key is found in the decrypted file; but,
    rejecting the decrypted file for use by the computer if the first key is not found, because failure to find the first key is an indication the computer has been hacked.

5. The method of claim 4 in which the second key is a key separate from the first key.

6. The method of claim 5 further including storing a copy of the file after it is encrypted using the second key and replacing the original file with the stored copy thereof if the first said key cannot be found after the file is decrypted, the replaced copy of the file then being used to perform the desired function.

7. A method of preventing a hacked computer file from being run on a computer thereby to prevent damage caused by hacking, comprising:
    selecting an program file run by the computer;
    randomly inserting a first key into the contents of the file;
    encrypting the resulting file using a second, separate key;
    decrypting the encrypted file prior to its subsequent use, the file being decrypted using the second key and the decrypted file now being examined for the first key embedded therein; and,
    validating the decrypted file for use by the computer if the first key is found in the decrypted file, but rejecting the decrypted file for use by the computer if the first key is not found because failure to find the first key in the decrypted file is evidence the file has been hacked.

8. The method of claim 7 further including storing a copy of the file after it is encrypted using the second key and replacing the original file with the stored copy thereof if the first said key cannot be found after the file is decrypted, the replaced copy of the file then being used to perform the desired function.

* * * * *